United States Patent [19]
Hegler et al.

[11] Patent Number: 5,320,697
[45] Date of Patent: Jun. 14, 1994

[54] METHOD FOR WELDING TOGETHER PIPES CONSISTING OF THERMOPLASTIC PLASTICS

[75] Inventors: Ralph-Peter Hegler, Bad Kissingen; Wilhelm Hegler, Goethestrasse 2, D-873o Bad Kissingen, both of Fed. Rep. of Germany

[73] Assignee: Wilhelm Hegler, Fed. Rep. of Germany

[21] Appl. No.: 935,851

[22] Filed: Aug. 26, 1992

[30] Foreign Application Priority Data

Sep. 7, 1991 [DE] Fed. Rep. of Germany ....... 4129855

[51] Int. Cl.$^5$ ............................................. B29C 65/22
[52] U.S. Cl. .................... 156/158; 156/273.9; 156/293; 156/304.2; 285/21; 285/903
[58] Field of Search ............ 156/158, 273.9, 274.2, 156/275.1, 293, 294, 304.2, 304.6, 304.5; 285/903, 21

[56] References Cited

U.S. PATENT DOCUMENTS

| | | | |
|---|---|---|---|
| 3,677,676 | 7/1972 | Hegler | 425/109 |
| 4,141,576 | 2/1979 | Lupke et al. | 285/903 |
| 4,202,568 | 5/1980 | Strom | 285/903 |
| 4,869,533 | 9/1989 | Lehmann et al. | 285/21 |
| 5,053,097 | 10/1991 | Johansson et al. | 156/158 |
| 5,163,717 | 11/1992 | Wise | 285/903 |

FOREIGN PATENT DOCUMENTS

| | | |
|---|---|---|
| 0190810 | 8/1986 | European Pat. Off. . |
| 0366299 | 5/1990 | European Pat. Off. . |
| 2012450 | 3/1970 | France ................ 156/304.5 |
| 425519 | 10/1982 | Sweden . |

*Primary Examiner*—Michael W. Ball
*Assistant Examiner*—Steven D. Maki
*Attorney, Agent, or Firm*—Laff, Whitesel, Conte & Saret

[57] ABSTRACT

For welding composite pipes together a welding ring is used, which bears against the side wall portions of elevations. It consists of thermoplastic material and is provided with an electric resistance heating. Prior to welding there is an annular gap between the front walls of the pipes to which annular gap a volume compensating groove is associated in the welding ring. A connection of the pipes in their region outside of their inner pipe is performed by an at least partial welding of the welding ring, the front walls bearing against each other in unwelded manner.

15 Claims, 3 Drawing Sheets

METHOD FOR WELDING TOGETHER PIPES CONSISTING OF THERMOPLASTIC PLASTICS

FIELD OF THE INVENTION

The invention relates to a method for welding together two pipes consisting of thermoplastic plastics each comprising an inner pipe with a front wall and elevations projecting radially outwards from the inner pipe, which elevations are defined by side wall portions.

BACKGROUND OF THE INVENTION

Pipes of the generic type, which are composite pipes or ribbed pipes, which are also called double-walled pipes, are connected in practice usually by means of tubular sleeve. In this case it can be so-called double plug-in tubular sleeve, into which the two pipes to be connected are plugged in, or tubular sleeve which are disposed or formed at a pipe end. In order to assure a fluidtight and/or gastight connection of the pipes, sealing rings on an elastomere basis are employed.

With full-walled pipes consisting of polyethylene or polypropylene it has become known in practice to plastify the front walls, which are to be interconnected and which extend vertically to the central longitudinal axis of the pipes, by means of a heated welding mirror, and subsequently—after pulling out the welding mirror—to join the pipes under a corresponding welding pressure. In practice it has also become known for composite pipes to produce a welded connection of this type, whereby the front walls to be welded with one another are arranged in the region of one corrugation trough, respectively, of the pipe. With this type of welded connection it is disadvantageous that a welding bead emerges at the inner wall of the pipe, which projects into the inner space of the pipe, through which fluids are transported. Welding beads of this type have to be removed by machining at correspondingly high expenses. In addition, when welding composite pipes or ribbed pipes, the pipe portions supporting the front walls have a relatively small thickness, so that the stability of the welded connection cannot always be guaranteed at least not under field conditions. Furthermore it is added that the mirror welding method can only be performed under difficulties at building sites, as face cutting of the front walls and their cleaning, welding, finishing of the inner beads and the like is combined with considerable expenses. Furthermore pipes consisting of thermoplastic plastics are unavoidably oval to a small extend, so that the wall thicknesses, which are anyway too small, of the wall portions to be welded with one another cannot be fully utilized. Therefore the mechanical properties of composite pipes or ribbed pipes welded in such manner are not always satisfying.

From U.S. Pat. No. 4,869,533 it is known to interconnect full-walled pipes by welding in such manner that a heating element is pushed over the ends facing each other, which is covered with plastics used for welding. Furthermore a tubular sleeve embracing the heating element is placed thereon. In the tubular sleeve outlet openings are disposed, through which excess plastics escapes, by means of which it is displayed simultaneously that the welding is completed. Connection of the full-walled pipes is performed at their outer side. By means of this no welding beads appear, which project into the inner space of the pipe. This type of welding full-walled pipes can be easily accomplished and is well suitable for construction sites. For connecting the pipes of the generic type this method, however, is only relatively suitable.

SUMMARY OF THE INVENTION

It is an object of the invention to create a method for welding pipes of the generic type, which can be used in particular for welding composite pipes and ribbed pipes and which guarantees optimum mechanical properties of the welded connection in addition to absolute tightness.

This object is attained by means of the method steps consisting in that a pipe is provided with a tubular sleeve projecting beyond its front wall, a welding ring consisting of thermoplastic plastics and provided with an electric resistance heating is pushed onto a portion of the inner pipe comprising a front wall, the two pipes are pushed in aligned manner in a direction towards each other in the tubular sleeve, the welding ring is melted at least in the region of its faces facing the adjacent elevations by means of actuating the electric resistance heating with electric current, the pipes are pressed in direction towards each other while deforming the welding ring until their front walls bear against each other, and in that the electric current is switched off, and the faces of the welding ring are connected by cooling with side wall portions of the elevations. The gist of the invention is that the region to be welded is displaced to the outer region of the composite pipes or ribbed pipes, the outer region being formed by the corrugation crests in case of composite pipes or by the radial ribs in case of ribbed pipes. In addition also the corrugation trough or the corrugation base and the tubular sleeve, which is primary necessary for centering the pipes, can be used for producing the welded connection. The method steps listed above need not always be performed in the sequence stated there. This means that, in particular when the tubular sleeve is formed as a double plug-in tubular sleeve, at first the welding ring can be plugged onto a pipe end and then the tubular sleeve can be pushed over it or can be pushed over the end of the other pipe. A welding ring separated from the tubular sleeve can be used. However, also a welding ring formed in one piece with the tubular sleeve can be used in an especially advantageous embodiment, whereby here the assembly of the welding ring and the tubular sleeve is performed simultaneously. If the welding ring and the tubular sleeve are separated from each other, then the electric resistance heating can also be provided in the region of the outer side of the welding ring, so that the welding ring and the tubular sleeve are welded with one another. If the tubular sleeve and the welding ring are formed in one piece, this is naturally no more necessary.

In order to assure that a connection between the welding ring and the side wall portions, bearing against the latter, of the elevations is performed at least on the whole surface, an annular gap is formed between the front walls, when the welding rings bear against the side wall portions of the elevation adjacent to the respective front wall and prior to the melting of the welding ring. In order to assure in turn in this case that no welding bead is formed at the inner side of the inner pipe, a welding ring is used, which is provided with a volume compensating recess.

Further advantages, features and details of the invention will become apparent from further dependent claims and from the ensuing description of examples of embodiment taken in conjunction with the drawing.

DESCRIPTION OF THE PREFERRED EMBODIMENTS

Figure 1:
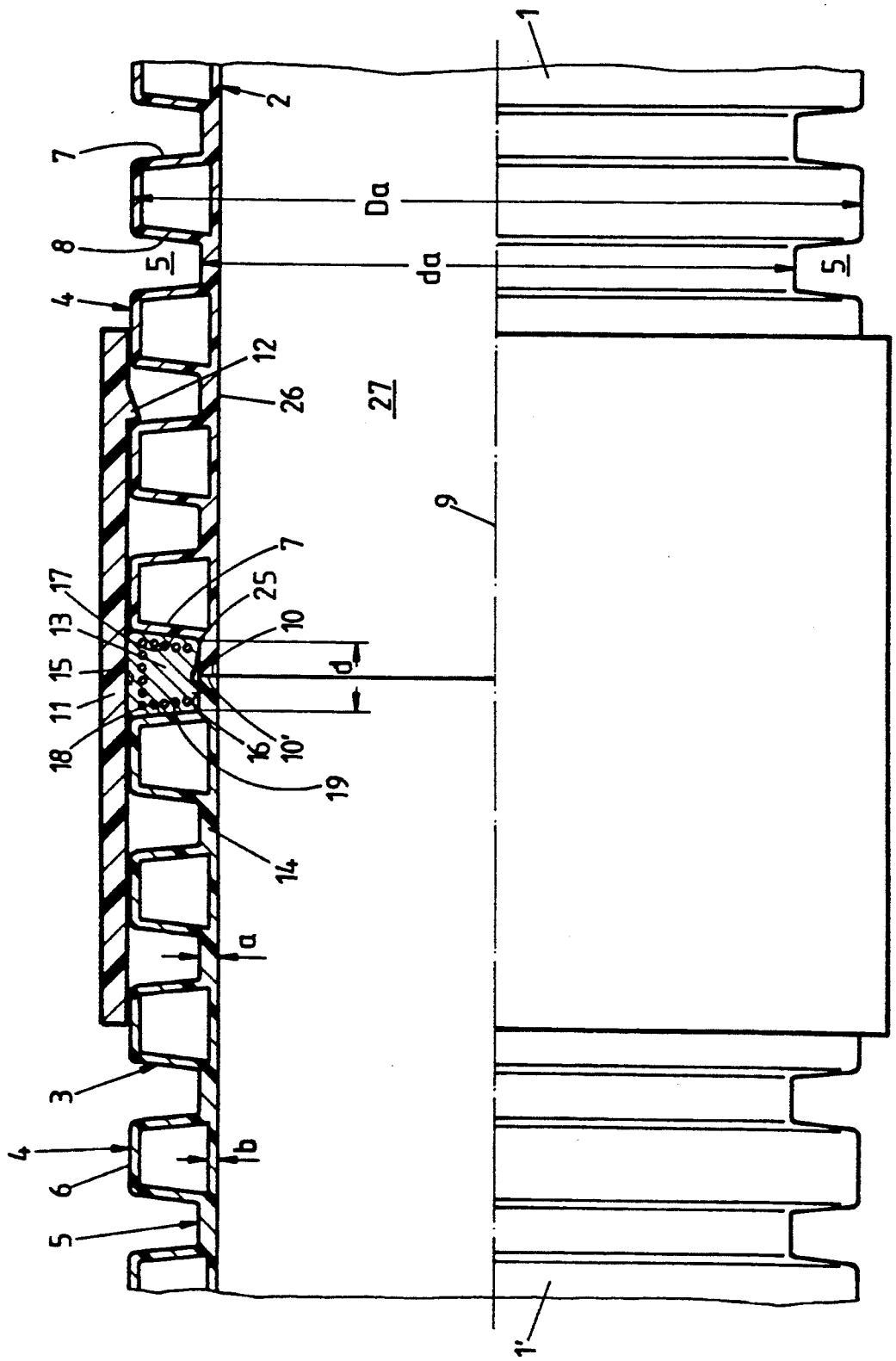
FIG. 1 shows two pipes welded with one another and formed as composite pipes in partially broken-up illustration.

FIG. 1 shows two pipes 1, 1' connected with each other, which are composite pipes or double-walled pipes. They each consist of a continuous cylindrical inner pipe 2 and a corrugated outer pipe 3. Manufacturing of these pipes is performed as is known from U.S. Pat. No. 3,677,676, the connection between inner pipe 2 and outer pipe 3 taking place, when the thermoplastic hoses of plastics which later form the inner pipe 2 and the outer pipe 3, are brought together behind the injection head of the extruder. In the region between two adjacent annular rings 4 of the outer pipe 3, i.e. in the region of a corrugation trough 5 of the outer pipe 3, the inner pipe 2 and the outer pipe 3 are integral and have a larger wall thickness a there than the wall thickness b of the inner pipe 2 within the annular ring 4.

Each annular ring 4 has the cross-section of an outwardly slightly tapering trapezoid—as can be seen from the drawing—this trapezoidal cross-section being defined by an annular cylindrical outer wall portion 6 on the outside and by two side wall portions 7, 8 on the side, which—related to the central longitudinal axis 9 of the pipes 1, 1'—are radially outwardly inclined towards each other. The basis of the trapezoid is formed by the respective inner pipe 2.

The two pipes 1, 1' bear flush against each other with their respective front wall 10, 10'. The front walls 10, 10' each are arranged in the region of a corrugation trough 5, i.e. where the wall thickness a is maximal.

Figure 2:
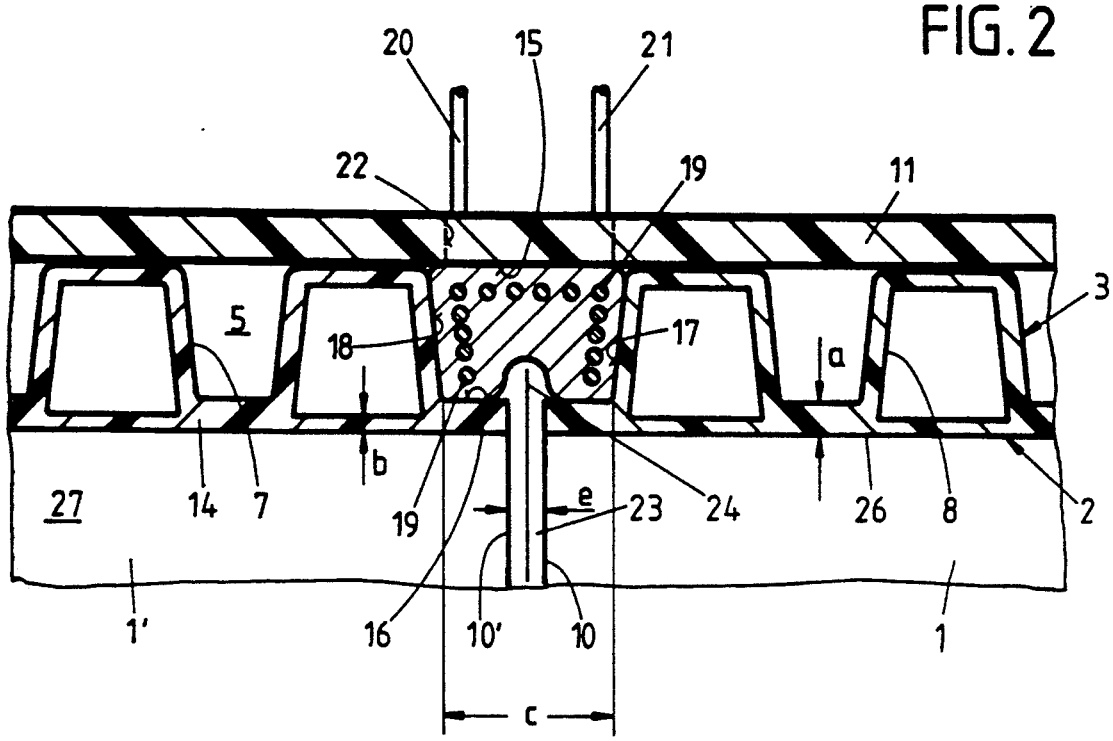
FIG. 2 shows a part-illustration of the pipes according to FIG. 1 in an illustration prior to welding.

The assembly of the two pipes 1, 1' formed as composite pipes is explained by means of FIGS. 1 and 2. After cutting-off the pipes 1, 1' in the region of the front wall 10, 10', a tubular sleeve 11 with an annular cylindrical cross-section is pushed onto the pipe 1, the inner diameter of which tubular sleeve 11 corresponding substantially to the outer diameter Da of the pipes in the region of the annular rings 4. The tubular sleeve 11 may comprise a barbed-like stop 12, which lies down behind a side wall 7 of an annular ring 4 after pushing the tubular sleeve 11 onto the pipe 1. Consequently, the tubular sleeve 11 is held on the pipe 1 in centered manner. The tubular sleeve 11 can also be connected with the pipe 1 by adhesion or by welding in lieu of a stop 12. The decisive fact is that the tubular sleeve 11 serves among other things for centering the two pipes 1, 1' in relation to each other.

After securing the socket 11 to the pipe 1 a welding ring 13 is inserted on the face into the region between the tubular sleeve 11 and the wall portion of the corrugation trough 14 comprising the front wall 10, and that as far as bearing against the side wall portion 7, which is adjacent to the front wall 10. The welding ring 13 has a cylindrical outer side 15, the diameter of which corresponds approximately to the diameter Da. It furthermore comprises a cylindrical inner side 16, the diameter of which corresponds approximately to the outer diameter da of the pipes 1, 1' in the region of the corrugation troughs 5. As can be seen from the drawing, the welding ring 13 is formed trapezoidal in its cross-section, its faces 17, 18 being radially outwardly inclined away from each other viewed from the axis 9, and that in correspondence with the inclination of the side wall portions 7, 8, so that the face 17 bears flat against the side wall portion 7 and the face 18 bears flat against the side wall portion 8. The welding ring 13 need not have this precise form of cross-section described above; for example, it can also bear against the side wall portions 7, 8 only in the upper region of its faces 17, 18. The decisive fact is that welding based on the welding pressure is performed.

The welding ring consists of thermoplastic plastics and that preferably of the same thermoplastic plastics as the pipes 1, 1'. It is provided with an electric resistance heating, the resistance wires 19 of which are arranged in particular adjacent to the faces 17, 18 and to the cylindrical outer side 15. In the region of the cylindrical inner side 16 as a rule no resistance wires 19 are provided. The connector ends 20, 21, extending from the cylindrical outer side 15 of the welding ring 13 of the resistance wires 19 are extended outwardly from the tubular sleeve 11 through openings or slots 22 in the tubular sleeve 11, which slots 22 are only outlined. As a rule the resistance wires 19 are formed by a multiply wound heating wire.

As can be seen from FIG. 2, during assembly, i.e. prior to welding (see FIG. 2) the axial extension c of the welding ring 13 in the region of its cylindrical inner side 16 is larger than the corresponding axial extension d after welding (see FIG. 1). From the difference of $c - d = e$ it results that an annular gap 23 with an axial width e remains after joining the pipes 1, 1' with the welding ring 13 in the socket 11 between the front walls 10, 10' of the wall portions of the corrugation troughs 14. In the cylindrical inner side 16 of the welding ring 13 a volume compensating groove is formed, which as a rule coincides with the annular gap 23.

After the described joining of the pipes 1, 1' the connector ends 20, 21 of the resistance wires 19 are connected to a power source. By means of the heat issued on this occasion the thermoplastic material of the welding ring 13 is melted in particular in the region of the faces 17, 18 and of the cylindrical outer side 15 and upon this simultaneously the facing surface region of the tubular sleeve 11 and of the side wall portions 7, 8 is melted on. The two pipes 1, 1' are pressed against each other in direction of the axis 9, until the front walls 10, 10' bear against each other, which are not or at least not completely welded with one another in this case. The volume of the welding ring 13, which is displaced when pressing together the pipes 1, 1', is taken up by the volume compensating groove 24 and by the other clearances between the welding ring 13, the side wall portions 7, 8 and the tubular sleeve 11. The volume compensating groove 24 is dimensioned such that after completely pressing together the pipes 1, 1', until the front walls 10, 10' bear against each other, there is still a residue compensating groove 25 at the joint of the front walls 10, 10' which embraces the latter. By means of this it is avoided that molten material of the welding ring 13 reaches into the annular gap 23 between the end walls 10, 10'. It is in particular furthermore avoided by means of this that material of the welding ring 13 or of the front walls 10, 10' arrives on the inner side 26 of the inner pipe 2 as a bead and thus projects into its inner space 27.

Figure 3:
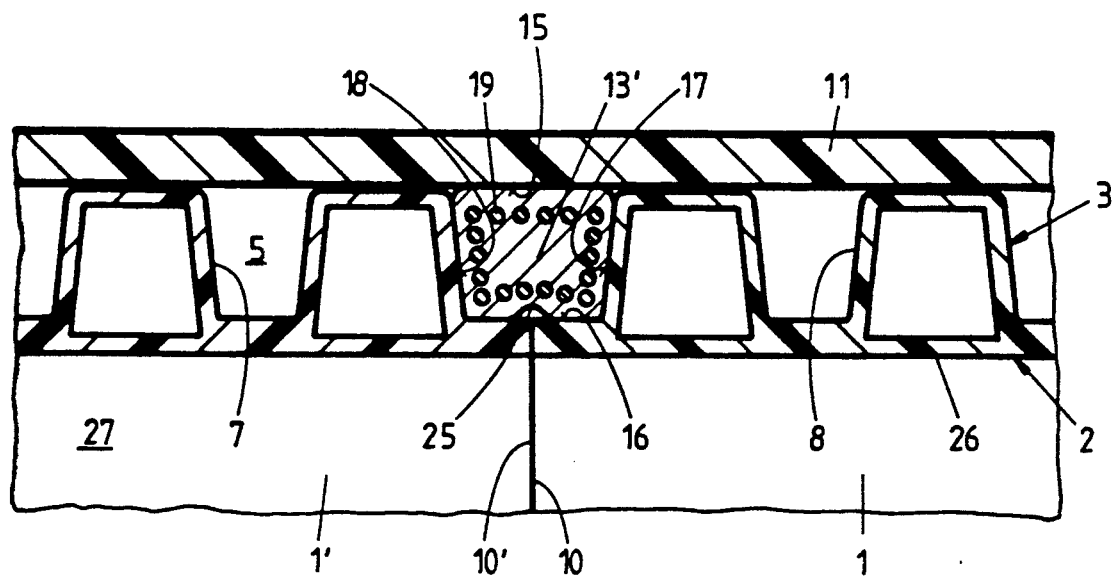
FIG. 3 shows a part-illustration from FIG. 1 with two composite pipes welded with one another employing a welding ring, which is modified compared with FIGS. 1 and 2.

The example of embodiment according to FIG. 3 differs from that according to FIGS. 1 and 2 only in that the welding ring 13' exceeding the embodiment according to FIGS. 1 and 2 is provided with resistance wires 19 also adjacent to its cylindrical inner side 16, their distance to the inner side 16, however, having to be as large as that there is sufficient place available for a volume compensating groove. As FIG. 3 shows the two pipes 1, 1' in the already connected condition, only the residue compensating groove 25 can be seen.

Figure 4:
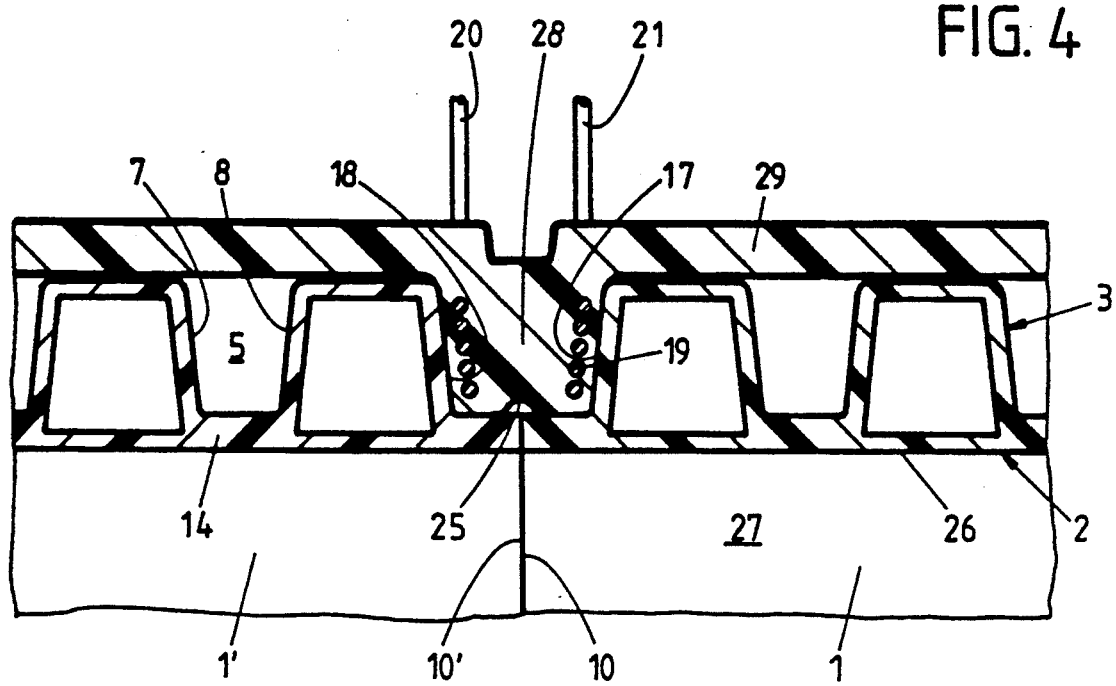
FIG. 4 shows a part-illustration of two composite pipes welded with one another for the welding of which a tubular sleeve with a welding ring in one piece was employed and FIG. 5 shows a part-illustration of two ribbed pipes welded with one another which corresponds to the type of illustration of FIGS. 3 and 4.

In the example of embodiment according to FIG. 4 with an identical embodiment of the pipes 1, 1' a welding ring 28 is formed in one piece with a tubular sleeve 29. The embodiment of the welding ring 28 with respect to its faces 17, 18 and its cylindrical inner side 16 corresponds to the above-described embodiment. As it is no more necessary to weld the welding ring 28 with the tubular sleeve 29, no heating wires 19 are provided at the transition between these two parts. On the contrary, only heating wires 19 are provided adjacent to the faces 17, 18. Prior to assembly a volume compensating groove 24 is formed in the region of the inner side 16 in like manner, from which, after pressing together and welding the pipes 1, 1', only a residue compensating groove 25 remains. The connector ends 20, 21 of the resistance wires 19 are extended directly from the tubular sleeve 29. The connector ends 20, 21—as well as the heating wires 19—are placed into the injection mold when producing the tubular sleeve 29 with the welding ring 28. In this embodiment the tubular sleeve 29 has no stop. The tubular sleeve 29 serves only for centering the two pipes 1, 1'.

Figure 5:
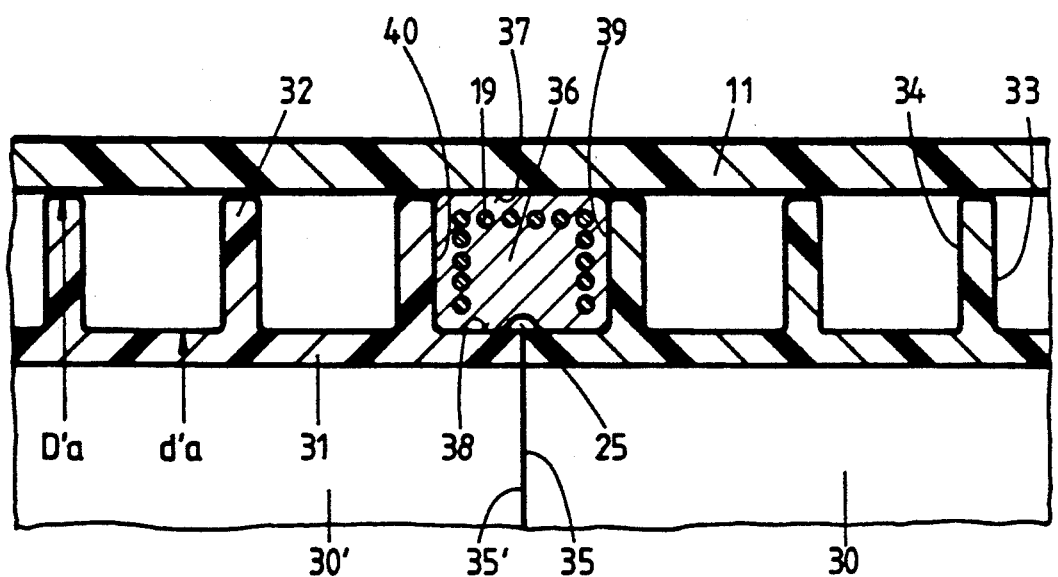

In FIG. 5 the pipes 30, 30' which are to be interconnected are ribbed pipes. Ribbed pipes of this type are known for example from U.S. Pat. No. 3,998,579 or from U.S. Pat. No. 4,900,503. They comprise a substantially annular cylindrical inner pipe 31, on the outer circumference of which radial ribs 32 project outwards, which have an outer diameter D'a. The inner pipe 31 has an inner diameter d'a. The ribs 32 comprise side wall portions 33, 34, which run at least approximately parallel to each other. At their inner pipes 31 the two pipes 30, 30' comprise front walls 35, 35', which are located at a distance to an adjacent rib 32. For the purpose of welding pipes 30, 30' of this type a welding ring 36 is used, which has an approximately rectangular cross-section, i.e. it comprises a cylindrical outer side 37, a cylindrical inner side 38 and two faces 39, 40. Similar to the embodiment according to FIGS. 1 and 2 electric resistance wires 19 are provided in the welding ring 36, adjacent to the faces 39, 40 and to the cylindrical outer side 37. In like manner as in the examples of embodiment according to FIGS. 1 to 3 the welding ring 36 is overdimensioned in direction to the axis 9 prior to assembly, so that prior to welding an annular gap is formed between the front walls 35, 35'. It comprises in like manner a volume compensating groove, from which after welding only a residue compensating groove 25 remains.

In lieu of the volume compensating groove 24 in the welding rings 13, 13', 28, 36 an opening not shown in the drawing can exist in the respective tubular sleeve 11, 29, from which opening the material of the welding ring, which is displaced when pressing the pipes together, can escape.

Primary polyethylene and that in particular high-pressure polyethylene and polypropylene is suitable as a material for the pipes 1, 1' or 30, 30' to be welded. As a rule, the welding rings 13, 13', 28, 36 consist of the same material as the pipes 1, 1' or 30, 30'.

In lieu of the tubular sleeve 11 also a centering ring can be used, which for example has the shape of a tubular sleeve that can be hinged and which serves for retaining the material of the welding ring 13 in the welding section. A centering ring of this type is removed after welding.

What is claimed is:

1. A method for welding together two pipes (1, 1'; 30, 30') comprising:
    providing two thermoplastic pipes (1, 1', 30, 30'), each pipe comprising a tube (2; 31) and elevations (4; 32) projecting radially outwards from the tube (2; 31), wherein said elevations are defined by side wall portions (7, 8, 33, 34), said tube has a front wall (10, 10' 35, 35') and each of said pipes have an outer diameter (Da; D'a),
    pushing a thermoplastic welding ring (13, 13'; 28; 36) onto a portion (14; 31) of the tube of said one pipe of said two pipes wherein said welding ring (13; 13', 28, 36) is provided with a volume compensating recess and electric resistance heating elements and has faces (17, 18, 39, 40).
    pushing the two pipes (1, 1', 30, 30') in an aligned manner in a direction towards each other so that the welding ring bears against adjacent side wall portions of the two pipes and
    an annular gap (23) is formed between the front walls (10, 10' 35, 35'),
    melting the welding ring (13, 13', 28, 36) at least in a region of its faces (17, 18, 39, 40) facing the adjacent sidewall portions by actuating the electric resistance heating elements with electric current,
    pressing the pipes (1, 1', 30, 30') towards each other while deforming the welding ring (13, 13'; 28, 36) and
    switching off the electric current and cooling the welding ring to connect the faces (17, 18, 39, 40) of the welding ring (13, 13', 28, 36) to the adjacent side wall portions (7, 8, 33, 34) of the two pipes.

2. Method according to claim 1, wherein said welding ring (13, 13'; 28; 36) has an outer side (15; 37) and said electric resistance heating elements are adjacent to said outer side (15; 37).

3. Method according to claim 1, wherein the welding ring (13; 13'; 28; 36) has a cylindrical inner side (16) with an inner diameter which corresponds approximately to the outer diameter (da; d'a) of the tube (2, 31).

4. Method according to claim 3, wherein the faces of said welding ring (13, 13', 28, 36) have an inclination which corresponds to an inclination of the adjacent side wall portions (7, 8, 33, 34).

5. Method according to claim 3 wherein said welding ring (13, 13'; 36) has an outer diameter which corresponds approximately to the outer diameter (Da; D'a) of the pipes (1, 1', 30, 30').

6. A method for welding together two pipes (1, 1'; 30, 30') comprising:

providing two thermoplastic pipes (1, 1', 30, 30'), each pipe comprising a tube (2; 31) and elevations (4; 32) projecting radially outwards from the tube, (2; 31), wherein said elevations are defined by side wall portions (7, 8, 33, 34), said tube has a front wall (10, 10', 35, 35') and each of said pipes have an outer diameter (Da; D'a), providing one pipe (1; 30) of the two pipes with a tubular sleeve (11; 29) projecting beyond the front wall (10; 35) of its tube (2; 31), pushing a thermoplastic welding ring (13, 13'; 28; 36) onto a portion (14; 31) of the tube of said one pipe of said two pipes wherein said welding ring (13; 13', 28, 36) is provided with a volume compensating recess and electric resistance heating elements and has faces (17, 18, 39, 40), pushing the two pipes (1, 1', 30, 30') in an aligned manner in a direction towards each other in the tubular sleeve (11; 29) so that the welding ring bears against adjacent side wall portions of the two pipes and an annular gap (23) is formed between the front walls (10, 10', 35, 35'), melting the welding ring (13, 13', 28, 36) at least in a region of its faces (17, 18, 39, 40) facing the adjacent sidewall portions by actuating the electric resistance heating elements with electric current, pressing the pipes (1, 1', 30, 30') towards each other while deforming the welding ring (13, 13'; 28, 36) until their front walls (10, 10', 35, 35') bear against each other and switching off the electric current and cooling the welding ring to connect the faces (17, 18, 39, 40) of the welding ring (13, 13', 28, 36) to the adjacent side wall portions (7, 8, 33, 34) of the two pipes.

7. Method according to claim 6 wherein said welding ring (13, 13'; 36) is separate from the tubular sleeve (11).

8. Method according to claim 7 wherein said electric resistance heating elements are adjacent to an outer side (15, 37) of the welding ring.

9. Method according to claim 7 wherein said welding ring (13, 13'; 36) has an outer diameter which corresponds approximately to the outer diameter (Da; D'a) of the pipes (1, 1', 30, 30').

10. Method according to claim 6, wherein said welding ring (28) is formed in one piece with the tubular sleeve (29).

11. Method according to claim 6 wherein the volume compensating recess is a volume compensating groove (24) at an inner side (16; 38) of the welding ring (13, 13', 28; 36) and said volume compensating groove (24) coincides with the annular gap (23).

12. Method according to claim 11, wherein a residue compensating groove (25) exists after pressing the pipes towards each other and coincides with the front walls (10, 10', 35, 35').

13. Method according to claim 6 wherein said welding ring (13, 13', 28, 36) has an inner diameter which corresponds approximately to an outer diameter (da; d'a) of the tube (2, 31).

14. Method according to claim 6, wherein the faces of said welding ring (13, 13', 28, 36) have an inclination which corresponds to an inclination of the adjacent side wall portions (7, 8, 33, 34).

15. Method according to claim 6, wherein the tubular sleeve (11, 29) has an inner diameter which corresponds approximately to the outer diameter (Da; D'a) of the pipes (1, 1'; 30, 30').

* * * * *